Patented Mar. 13, 1934

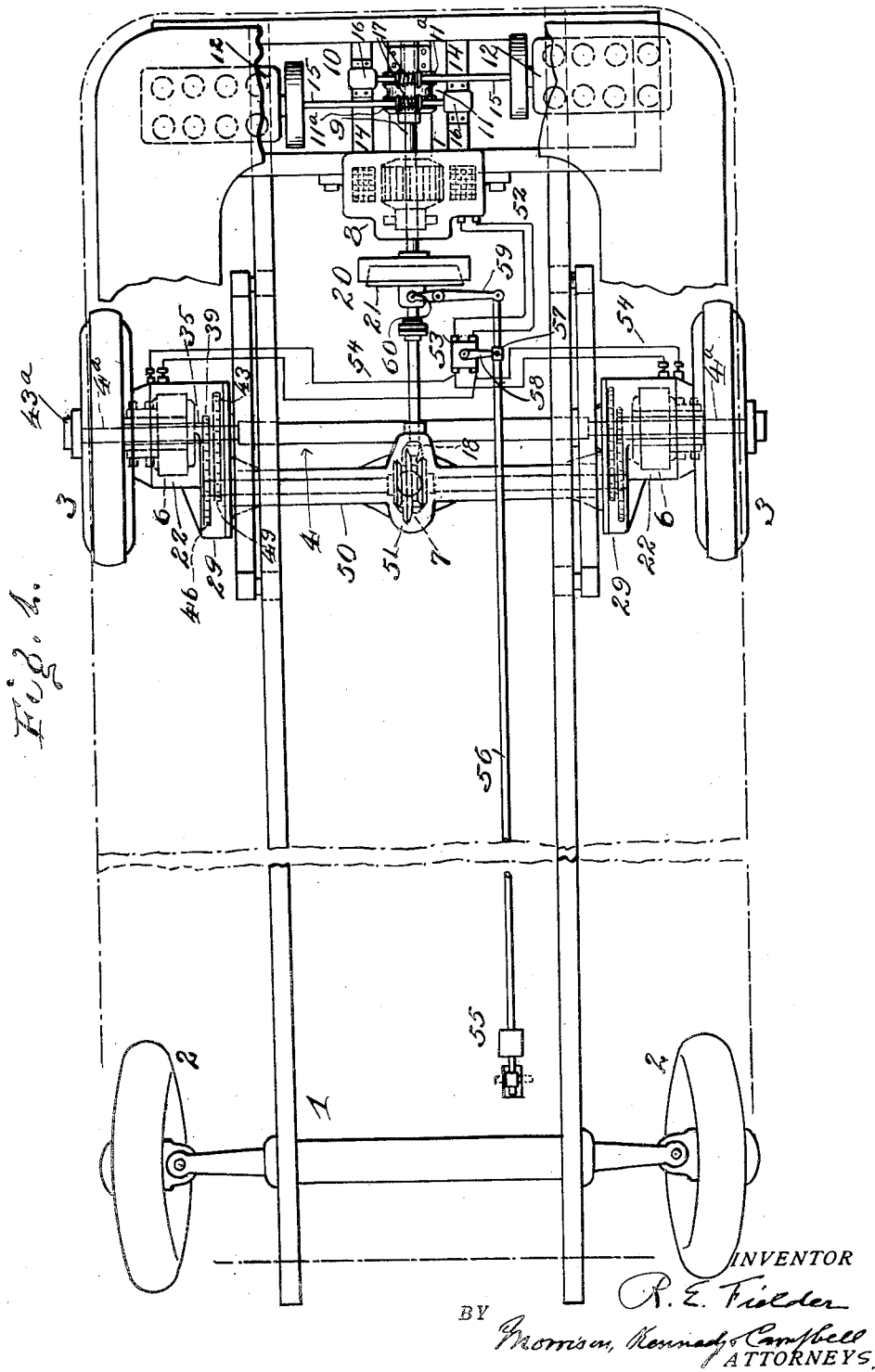

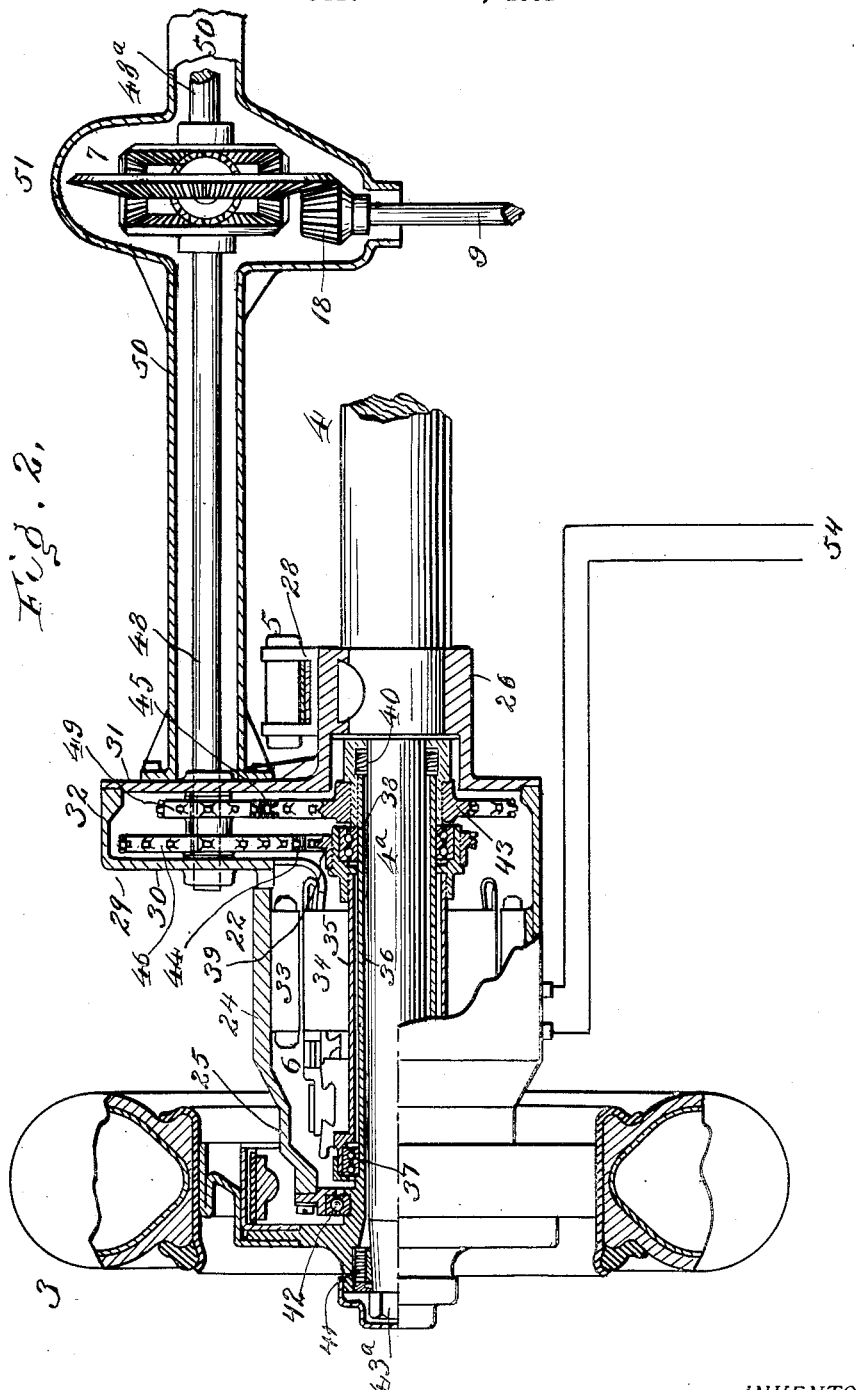

1,951,089

UNITED STATES PATENT OFFICE 1,951,089

DRIVING MECHANISM FOR MOTOR VEHICLES

Reuben E. Fielder, Windsor, Ontario, Canada

Application December 12, 1931, Serial No. 580,551

6 Claims. (Cl. 180—65)

This invention relates to drive mechanisms for motor vehicles, characterized by the use of a gasoline engine to drive an electric generator in furnishing electric current to motors driving the ground wheels of the vehicle.

In driving mechanisms of this type the defect exists that the gas engine is not directly connected with the driving wheels of the vehicles, consequently during the free running of the vehicle at high speed, there occurs a regeneration of electric current from the driving motors, which feeds back into the generator and causes it to speed up the gas engine, and a wasteful consumption of gasoline, and an excessive wear on the engine results.

In accordance with the present invention, while I employ a gas engine or engines to drive an electric generator, and by means of the generator supply the necessary current for the electric motors driving the ground wheels, I provide in addition means whereby the supply of current to the motors may be cut off when desired, and in connection therewith I provide means to connect the engine mechanically with the drive wheels; whereby, according to the conditions encountered in practice, I am enabled to drive the vehicle either electrically through the medium of the electric motors, or mechanically through the medium of the gas engine, as desired.

Under such an arrangement of the parts, electrical drive of the vehicle may be employed during acceleration from a standstill, and for intermediate ratios for hill climbing, while in the free running of the vehicle on level roads, or downhill, the ground wheels may be driven from the gas engine through the usual differential gearing, and gearing of low ratio. This method of operation under the changing conditions mentioned, enables the electric motors to be made smaller and lighter in weight than heretofore, since they will only be operated intermittently and can stand overloading for the brief periods needed to accelerate or climb steep grades, between which periods they can cool off and thus maintain their efficiency.

In the specification to follow, the invention will be described in detail, and the novel features thereof will be pointed out in the appended claims.

In the accompanying drawings:

Fig. 1 is a plan view, diagrammatic in character, of a vehicle driving mechanism having my invention embodied therein, certain parts being broken away; and Fig. 2 is an enlarged elevation, partly in section, of one end of the transverse load supporting member of the vehicle, showing the electric motors incorporated therein, the differential gearing through which the ground wheels are driven mechanically from the gas engine, and the electric generator for supplying current to the electric motors.

Referring to the drawings:

A chassis frame 1 provided with fore-and-aft extending frame bars is supported at its front by the usual steering wheels 2, and at its rear by driving ground wheels 3, which latter are journalled on the ends of a fixed transverse load supporting member 4 in the manner shown in Fig. 2, which load supporting member gives support to the chassis frame through the medium of the usual springs 5 shackled or otherwise connected to the chassis frame and seated on or fastened to the load supporting member.

The ground wheels are adapted to be driven either by electric motors 6 incorporated in the ends of the load supporting member, or mechanically through a differential gearing 7 as desired, according to the conditions encountered in practice, as will be presently described in detail.

The electric motors are supplied with current from an electric generator 8 supported near the rear end of the chassis frame, which generator is driven by a generator shaft 9 coupled to the generator and having its rear end journalled in a transverse frame member 10 fixed to and carried by the rear end of the chassis frame. This shaft near its rear end has fixed to it a driving member 11 which is driven in the present instance, by two gasoline engines 12, arranged one on either side of the shaft 9.

The gasoline engines are supported on the transverse frame member 10 and are arranged preferably under the floor of the vehicle body, so that the full extent of the floor space of the vehicle is available for passenger seats and is unobstructed by the engines.

The engines 12 are similar as to their direction of rotatable drive, and their shafts 15 are extended inwardly towards each other and over the driving member 11 and overlap at their inner ends where they are journalled in suitable bearings 16 supported on cross bars 14 of the frame member 10.

The driving member 11 is in the present instance in the form of a wheel formed with two sets of worm teeth 11ª, which are engaged respectively by right and left worms 17 on the engine shafts 15, whereby, notwithstanding the opposite disposition of the two similar engines, their driving effort on the worm wheel member will be exerted in the same direction.

The generator shaft 9 extends forwardly from the generator in the form of a propeller shaft 5 and is provided at its front end with a bevelled gear 18 meshing with a differential gearing 7 supported by the transverse load supporting member and having driving connection with the ground wheels in the manner presently to be described in detail, and between the generator and differential gearing, said shaft has applied to it a friction clutch 20 embodying a movable clutch member 21 by the shifting of which the generator shaft may be connected in driving relation with the differential gearing when the ground wheels are to be driven mechanically from the gas engine, or may be disconnected from driving relation with the differential gearing when the ground wheels are to be driven electrically through the medium of the motors 6.

As shown, the load supporting member 4 comprises a solid axle portion whose ends are formed as spindles 4a and housings 22 surrounding and keyed fixedly to the axle portions, so as thereby to form in effect a part of the same, the load supporting member being thus made up jointly of the axle portion with its end spindles, and the end housings fixed thereto. These housings enclose the electric motors 6, and as the housings and motors and associated parts are identical in construction at both ends of the load supporting member, a description of the parts at one end will suffice.

The housing 22 is cylindrical in cross section and is formed with an enlarged central portion 24 and with reduced outer and inner portions 25 and 26 respectively, the latter being flattened on its upper side to form a seat for the spring clip 28. At its inner end the enlarged portion of the housing is extended radially at one side as at 29, thereby forming a lateral extension of the chamber within the housing, which extension is provided with outer and inner opposing flat walls 30 and 31 and with an end wall 32.

The motor 6 within the housing comprises a motor field 33 fixed to the housing within the enlarged central portion of the same, and a rotary armature 34 disposed within said field and fixed to a driving member in the form of a sleeve 35 surrounding the axle spindle. This driving sleeve 35 is rotatably supported at its inner and outer ends by a driven member in the form of a sleeve 36 surrounding the spindle between the latter and the driving sleeve, the support of the driving sleeve being effected through the medium of an outer anti-friction bearing 37 and an inner anti-friction bearing 38, and at its inner end the sleeve 35 has fixed to it a sprocket wheel 39, the purpose of which will presently appear.

The driven sleeve 36 is rotatably supported on the axle spindle by an inner anti-friction bearing 40, and an outer anti-friction bearing 41, and is further supported within the outer end of the housing by means of an anti-friction bearing 42. Near its inner end, and at a point inward of the sprocket wheel 39, the sleeve 36 has fixed to it a sprocket wheel 43 by which, in the electrical drive of the ground wheel, the rotary motion of the driving sleeve 35 is imparted to the driven sleeve 36 and to the ground wheel, whose hub is fixed to the outer end of the sleeve 36, and together with the sleeve is confined on the spindle by a hub nut 43a.

The motion of the driving sleeve 35 is, in the electrical drive of the ground wheel, transmitted to the driven sleeve 36, and consequently to the ground wheel, at relatively reduced speed, through the medium of sprocket chains 44 and 45, the chain 44 passing around the sprocket wheel 39, and around a sprocket wheel 46 of relatively larger diameter fixed on the outer end of a countershaft 48 having driving engagement at its inner end with the differential gearing 7, and having a bearing at its outer end in the walls 30 and 31 of the radial extension 29 of the load supporting member, the said sprocket wheel 46 being located on said shaft between said walls 30 and 31. By these means the motion of the driving sleeve 35 is transmitted to the countershaft at a reduced speed. The sprocket chain 45 passes over the sprocket wheel 43 and over a sprocket wheel 49 fixed on said countershaft between the said walls 30 and 31 and at the inner side of wheel 46, the said wheel 49 being of a diameter less than that of the wheels 43 and 46, whereby in the electric drive of the ground wheel, the motion of the countershaft is in turn transmitted to the driven sleeve, and consequently to the ground wheel, at a speed further reduced.

It will be understood that a similar countershaft 48a with its inner end in driving relation to the differential gearing, extends outwardly from said gearing and has its outer end mounted in bearings in the walls of the radial extension 29 of the load supporting member at that end of the same, in order to provide for the drive of the ground wheel at that side. These two countershafts are surrounded respectively by tubular housings 50 fixed at their outer ends to the inner walls 31 of the said radial extensions 29, and merged at their inner ends into an enlarged shell or casing 51 surrounding and enclosing the said differential gearing.

Electric current from the generator 8 is supplied to the motors at the opposite sides of the vehicle, by means of suitable electric conductors 52 which lead from the generator to a controlling switch mechanism 53, whence the conductors lead by branches 54, 54 to the respective motors at the opposite ends of the load supporting member. Under these conditions by operation of the switch mechanism, the current to the motors may be cut off when the ground wheels are to be driven mechanically from the gas engines, and said current may be turned on when the ground wheels are to be electrically driven by their motors. While various forms of controlling mechanism may be devised to govern these operations, I prefer to arrange the parts so that the clutch and switch will be operated in coordination, the operation to connect the clutch for mechanical drive automatically cutting off the current to the motors, and the disconnection of the clutch for electrical drive automatically operating the switch to turn on the current. To effect this object, I provide a common operating lever 55 under the control of the driver, from which lever extends rearwardly a link or rod 56 pivoted near its rear end as at 57 to a switch operating lever 58, and pivoted at its rear end to a pivoted lever 59 operatively connected as at 60 to the movable member 21 of the clutch mechanism. The form and relation of these parts is such that when the link 56 is thrust rearwardly, the clutch will be disconnected, and the switch will be operated to close the circuit, and when the link is pulled forwardly, the clutch will be connected, and the switch will be operated to break the circuit.

On the operation of the parts to thus disconnect the clutch and close the circuit from the generator to the motors, the ground wheels will be electrically driven by their motors, in which action the motion of the driving sleeves 35 on the motor armatures will be transmitted at reduced speed to the driven sleeves 36, and consequently to the ground wheels, through the medium of the sprocket wheels 39, sprocket chains 44, sprocket wheels 46, differential countershafts 48 and 48ª, sprocket wheels 49, sprocket chains 45, and sprocket wheels 43, in which operation the differential gearing will function to allow the electric motors to differentiate with one another according to load conditions.

When now the control lever 55 is operated to connect the clutch and break the circuit to the motors, the ground wheels will be driven mechanically from the gas engines, utilizing in this driving action the generator shaft and differential gearing, and in this operation the motion of the differential gearing will be transmitted to the ground wheels through sprocket wheels 49, sprocket chains 45, sprocket wheels 43, and driven sleeves 36, and the motor armatures and the driving sleeves on which they are mounted will rotate idly and be kept in motion, so that in changing again from mechanical to electrical drive, it will not be necessary to overcome the inertia of the parts, and the smooth operation of the mechanism will be assured.

While in the foregoing description and accompanying drawings the invention has been set forth in the particular detailed form of the parts which I prefer to adopt, it will be understsod that these details may be variously changed and modified without departing from the limits of the invention; and further, it will be understood that the invention is not limited to any particular from or construction of the parts, except in so far as such limitations are specified in the claims.

Having thus described my invention, what I claim is:—

1. In a motor vehicle adapted to be driven by both electrical and mechanical motive power, driving mechanism, including, in combination, ground driving wheels, electric motors for driving said wheels through reduction gearing, spindles on which said driving wheels and electric motors are mounted, a gas engine for driving said wheels through differential gearing, axle shafts associated with said differential gearing, driving connections between the electric motors and the axle shafts, driving connections with said wheels common to both said differential and reduction gear drives, and means for simultaneously rendering said electrical drive inoperative when the mechanical drive is rendered operative, and vice versa.

2. In a motor vehicle adapted to be driven by both electrical and mechanical motive power, driving mechanism, including, in combination, ground driving wheels, a gas engine for driving said wheels mechanically, electric motors for driving said wheels electrically, spindles on which the driving wheels and electric motors are mounted, a generator operated by said gas engine for supplying electric current to the electric motors, a train of driving connections for the mechanical drive including differential gearing, axle shafts associated with said differential gearing, another train of driving connections for the electrical drive including reduction gearing and connecting the electrical drive to the axle shafts, and driving connections between the axles and wheels common to the trains of driving connections for both the electrical and mechanical drives.

3. In a motor vehicle adapted to be driven by both electrical and mechanical motive power, driving mechanism, including, in combination, ground driving wheels, a gas engine for driving said wheels mechanically, electric motors for driving said wheels electrically, spindles on which the driving wheels and electric motors are mounted, a generator operated by said gas engine for supplying electric current to the electric motors, a train of driving connections for the mechanical drive including differential gearing, axle shafts associated with the differential gearing, another train of driving connections for the electrical drive including reduction gearing and connecting the electrical drive to the axle shafts, driving connections between the axles and wheels common to the trains of driving connections for both the electrical and mechanical drives, and means for simultaneously rendering the electrical drive inoperative when the mechanical drive is rendered operative, and vice versa.

4. In a motor vehicle adapted to be driven by both electrical and mechanical motive power and being equipped with ground driving wheels, differential gearing through which one drive is effected, axle shafts associated with the differential gearing, driving connections with the axle shafts through which the other drive is effected, spindles on which the driving wheels are rotatably mounted, and driving connections between the driving wheels and the axles, whereby the operation of one of the drives will effect the idle operation of the driving connections for the other drive and thereby provide for a smooth shift from one drive to the other.

5. In a motor vehicle adapted to be driven by both electrical and mechanical motive power and being equipped with ground driving wheels, differential gearing through which the mechanical drive is effected, supporting spindles, driving sleeves mounted on the spindles and carrying the driving wheels, axle shafts associated with the differential gearing, driving connections between the axle shafts and the driving sleeves, electric motors supported by the spindles, the armatures of the motors being rotatably mounted on the driving sleeves, and driving connections between the armatures and the axle shafts, the drive by both power means through the axles causing whichever driving connections are in operation to effect an idle drive of the other driving connections and thereby provide for a smooth shift from one drive to the other.

6. In a motor vehicle adapted to be driven by both electrical and mechanical motive power and being equipped with ground driving wheels, differential gearing through which the mechanical drive is effected, supporting spindles, driving sleeves mounted on the spindles and carrying the driving wheels, axle shafts associated with the differential gearing, driving connections between the axle shafts and the driving sleeves, electric motors supported by the spindles, armature carrying sleeves rotatably mounted on the driving sleeves, and driving connections between said last mentioned sleeves and the axles, the drive of both power means through the axles causing whichever driving connections are in operation to effect an idle drive of the other driving connections and thereby provide for a smooth shift from one drive to the other.

REUBEN E. FIELDER.